(12) United States Patent
Lee et al.

(10) Patent No.: US 7,211,318 B2
(45) Date of Patent: May 1, 2007

(54) INCOMBUSTIBLE COMPOSITION FOR FIRE DOOR/WALL, FIRE DOOR/WALL USING INCOMBUSTIBLE COMPOSITION, AND METHOD OF PRODUCING FIRE DOOR/WALL

(75) Inventors: Sang-Hoon Lee, Seoul (KR); Jun-Han Choi, 606-1601Baengma Maeul Byeoksan Apt., 719 Madu-Dong, Ilsan-Gu, Goyang-Si, Gyeonggi-Do 411-709 (KR); Byung-Ick Yoon, Seoul (KR)

(73) Assignee: Jun-Han Choi, Gyeonggi-Do (KR)

( * ) Notice: Subject to any disclaimer, the term of this patent is extended or adjusted under 35 U.S.C. 154(b) by 0 days.

(21) Appl. No.: 10/950,550

(22) Filed: Sep. 28, 2004

(65) Prior Publication Data
US 2005/0066622 A1  Mar. 31, 2005

(30) Foreign Application Priority Data
Sep. 29, 2003 (KR) ...................... 10-2003-0067418

(51) Int. Cl.
*B32B 19/02* (2006.01)
*E04C 2/54* (2006.01)
*E04B 1/62* (2006.01)
*C04B 14/18* (2006.01)
*C03C 13/06* (2006.01)

(52) U.S. Cl. .................... 428/292.1; 52/784.11; 264/112; 428/317.9; 106/18.12; 106/602; 501/36

(58) Field of Classification Search ................ 428/245, 428/703, 248, 920
See application file for complete search history.

(56) References Cited

U.S. PATENT DOCUMENTS 4,452,635 A * 6/1984 Noshi et al. ................ 106/628
4,572,862 A * 2/1986 Ellis ........................... 442/136

* cited by examiner

*Primary Examiner*—Rena Dye
*Assistant Examiner*—Brett A Crouse
(74) *Attorney, Agent, or Firm*—Arent Fox LLP

(57) ABSTRACT

Disclosed is an incombustible composition for a fire door/wall, the fire door/wall using the incombustible composition, and a method of producing the fire door/wall. The incombustible composition includes 1 to 80 wt % of organic or inorganic fiber, 1 to 80 wt % of fly ash or bottom ash, 1 to 80 wt % of fire-proofing agent, 1 to 30 wt % of curing fire-retardant resin, and 1 to 40 wt % of incombustible hollow filler. Furthermore, the method includes providing the incombustible composition, mixing the fly ash or bottom ash, fire-proofing agent, and curing fire-retardant resin with each other, adding the organic or inorganic fiber into a mixture, shattering the mixture containing the organic or inorganic fiber, mixing an incombustible hollow body with the shattered mixture by use of a mixer using air, pressing the resulting mixture using a high pressure hot press to form a board or a square timber, constructing a frame of the fire door/wall using the board and/or square timber, and embedding an incombustible core material into the fire door/wall. As well, 1 to 70 wt % of the incombustible composition may be made of a waste material. Accordingly, the incombustible composition is advantageous in that the production costs are reduced, and that it is useful as a construction finishing and interior material because no fire and toxic gases occur when the incombustible composition is on fire.

17 Claims, No Drawings

INCOMBUSTIBLE COMPOSITION FOR FIRE DOOR/WALL, FIRE DOOR/WALL USING INCOMBUSTIBLE COMPOSITION, AND METHOD OF PRODUCING FIRE DOOR/WALL

BACKGROUND OF THE INVENTION

1. Field of the Invention

The present invention pertains to an incombustible composition for a fire door/wall, the fire door/wall using the incombustible composition, and a method of producing the fire door/wall. More particularly, the present invention relates to an incombustible composition, which is used as construction finishing and interior materials of a fire door/wall, being safe from fire, to prevent fire from spreading and to prevent toxic gases from being generated from the construction finishing and interior materials when the construction finishing and interior materials are on fire, the fire door/wall using the incombustible composition, and a method of producing the fire door/wall.

2. Description of the Prior Art

Generally, a steel plate is widely used as a representative material of a fire door, and the typical fire door mostly consists of a steel door made of the steel plate. However, the steel door is disadvantageous in that the steel door has poor a heat-intercepting property and processability even though it can prevent fire and toxic gases from spreading because it is made the steel plate. Additionally, it is impossible to enable the steel door to be subjected to various finishing treating processes, and thus, the steel door has a limited appearance.

Desired physical properties required for construction finishing and interior materials may be obtained by changing contents of components constituting the construction finishing and interior materials. However, the steel door insufficiently has the desired physical properties, and thus, the use of the steel door is applied to limited fields.

To avoid the above disadvantage, an effort has been made to attach fire-retardant materials to the steel door. However, it is difficult to attach the fire-retardant materials to the steel door. Meanwhile, conventional developments of the fire-retardant materials are mostly focused on coating a fire-retardant pigment on or attaching a fire-retardant film to MDF or plywood, having no fire-retardancy, thereby securing fire-retardancy. However, the conventional developments ensure the insufficient fire-retardancy.

On the other hand, a wood fire door, which includes a square timber, mostly consisting of a plaster, and a mineral board, has been used for a long time in foreign countries. However, the wood fire door has disadvantages in that it is expensive, thick and heavy. Furthermore, the wood fire door has not various appearances.

The MDF or plywood is produced by pressing and shaping wood chips using an organic adhesive, and most widely used as the construction finishing and interior materials. However, the MDF or plywood has no fire-retardancy, thereby catching fire easily.

To avoid the above disadvantage, an inorganic adhesive may be used instead of the organic adhesive. However, the MDF or plywood, produced using the inorganic adhesive, is disadvantageous in that layers constituting the MDF or plywood are easily separated from each other and the MDF or plywood is easily damaged, thereby reducing productivity of the MDF or plywood. Additionally, because only the adhesive is made of an inorganic material and the MDF or plywood mostly consists of the combustible wood chips, the MDF or plywood has not sufficient fire-retardant ability (incombustibility, quasi-incombustibility, and fire-retardancy). Hence, it is difficult to commercialize the MDF or plywood using an inorganic adhesive.

As for the plaster board with fire-retardancy, technologies have been developed to attach the fire-retardant board to the plaster board and to attach the incombustible steel or aluminum plate to the plaster board. In this regard, the plaster board is disadvantageous in that a plaster, used as a main component of the plaster board, is relatively heavy, and it is impossible to process the plaster in order to use it as a construction finishing material. However, a technology of a material capable of being used instead of the plaster, has not yet been developed, and thus, the plaster board is still used as construction finishing and interior materials, having the fire-retardancy.

In addition, the wood-wool cement board has been used as the construction finishing and interior materials. The wood-wool cement board is produced by mixing various substances with cement. Examples of the above substances may include relatively light paper particles, perlites, Styrofoam particles, vermiculites, bottom ash, and a mixture thereof, and various additives may be added into the wool-wood cement board in accordance with the use of the wood-wool cement board.

However, the wood-wool cement board is used as construction exterior and ceiling materials rather than the construction finishing and interior materials because the wood-wool cement board has slightly different physical properties from a cement board. In other words, the wood-wool cement board does not serve to radically modify physical properties of the cement board.

Currently, an incombustible construction finishing and interior material is developed, which is produced by pressing and shaping incombustible alumina powder ($Al_2O_3$). However, it is difficult to finishing the construction finishing and interior material, the construction finishing and interior material is more expensive than the MDF or plywood by ten times or more, and thus, it is only applied to special fields but scarcely used in general construction finishing and interior material.

According to the existing Building Standards Act and Fire Services Act in Korea, a finishing and interior material, used in buildings, must be incombustible, quasi-incombustible, or fire-retardant, and the buildings, larger than a predetermined scale, must include fire-proofing sections to prevent the fire from spreading and to shield persons from fire. As well, a fire door, made of a material capable of enduring fire for 30 minutes or one hour must be installed at the fire-proofing sections.

Furthermore, the legally regulated finishing and interior material is evaluated as three categories according to the KS (Korean Standard) F2271 method (a fire-retardant performance test method for construction materials): first-grade fire-retardancy (incombustible materials), second-grade fire-retardnacy (quasi-incombustible materials), and third-grade fire-retardancy (fire-retardant materials). Particularly, the fire door is evaluated as the first fire door, enduring fire for one hour, and the second fire door, enduring fire for 30 minutes, according to the KS F2257 method, and it is stated in the Building Standards Act that only the fire door, having performances satisfying the above standards, may be used in the buildings.

The Building Standards Acts of different countries may be slightly different from each other. However, all countries regulate the standards regarding the performances of the construction finishing and interior material, and the Building Standards Act of each country provides that only the materials, having the performances satisfying the above standards, may be applied to the buildings. The reason for this is that the use of the desirable construction finishing and interior material contributes to preventing fire from spreading and to shielding persons in the buildings from toxic gases occurring due to fire.

However, most of the commercial construction finishing and interior materials insufficiently satisfy the above standards, and do not sufficient physical properties required to be used as the construction finishing and interior material even though they have incombustibility, quasi-incombustibility, or fire-retardancy.

Heretofore, the construction finishing and interior materials with excellent performance have not yet been developed even though many studies have been conducted to develop the construction finishing and interior materials, having incombustibility, quasi-incombustibility, or fire-retardancy. In detail, the MDF or plywood as described above is the most widely used as the construction interior material because the MDF or plywood is inexpensive and lightweight, has excellent processability, and ease of its use in building constructing is ensured. However, the MDF or plywood has poor water-resistance, and no incombustibility, quasi-incombustibility, or fire-retardancy, thereby catching fire easily and accelerating the spread of fire. Accordingly, the use of the MDF or plywood is limited by the existing Building Standards Act in Korea.

In addition, the plaster board is made of waste chemical gypsum, discharged from a fertilizer plant or a power plant, plaster and the like. The plaster board is inexpensive, and has excellent processability. Further, the ease of use in building constructing is ensured, and the plaster board has incombustibility, quasi-incombustibility, or fire-retardancy. Hence, the plaster board is used as a representative construction finishing and interior material with incombustibility, quasi-incombustibility, or fire-retardancy. However, the plaster board is problematic in that it is very weak against water, easily damaged due to its poor strength, and brings about pollution because a lot of dust is created when it is processed and most of the used plaster board cannot be regenerated. Furthermore, it is difficult to shape the plaster board in various designs and to apply the plaster board to various fields because papers are attached to a surface of the plaster board.

As for the wood-wool cement board, it has excellent strength, water-resistance, and incombustibility, quasi-incombustibility, or fire-retardancy. However, the wood-wool cement board has poor processability, and is relatively heavy and easily damaged. As well, ease of its use in building constructing is not ensured. Therefore, the wood-wool cement board is used as exterior wall materials or surface materials of the buildings, but scarcely used as the construction finishing and interior materials.

SUMMARY OF THE INVENTION

Accordingly, the present invention has been made keeping in mind the above problems, such as poor heat-intercepting property of a conventional steel/wood fire door and a difficulty in applying various finishing materials to the conventional steel/wood fire door, occurring in the prior art, and an object of the present invention is to provide an incombustible composition for a fire door/wall, which mostly consists of waste materials, and which is environmentally-friendly and inexpensive. In this regard, the incombustible composition has excellent hardness, strength, water-resistance, and incombustibility, and also has various appearances.

Another object of the present invention is to provide a method of producing a fire door/wall, having all desirable physical properties, required for construction material, as well as incombustibility, using an incombustible composition.

A further object of the present invention is to provide a fire door/wall, produced according to the above method, which is safe from fire, and which prevents fire from spreading and prevents toxic gases from being generated from the fire door/wall when the fire door/wall is on fire. In this regard, the fire door/wall has excellent heat-intercepting and fire-proofing properties and various appearances, and is competitive in terms of economic efficiency.

In order to accomplish the above object, the present invention provides an incombustible composition for a fire door/wall, which includes 1 to 80 wt % of organic or inorganic fiber, 1 to 80 wt % of fly ash or bottom ash, 1 to 80 wt % of fire-proofing agent, 1 to 30 wt % of curing fire-retardant resin, and 1 to 40 wt % of incombustible hollow filler.

Additionally, the present invention provides a method of producing an incombustible fire door/wall. The method includes providing the incombustible composition; mixing a fly ash or bottom ash, a fire-proofing agent, and a curing fire-retardant resin with each other; adding an organic or inorganic fiber into a mixture, shattering the mixture containing the organic or inorganic fiber, mixing an incombustible hollow body with the shattered mixture by use of a mixer using air; pressing the resulting mixture using a high pressure hot press to form a board or square timber; and constructing a frame of the fire door/wall using the board and/or square timber and embedding an incombustible core material into the fire door/wall.

Furthermore, the present invention provides an incombustible fire door/wall produced according to the above method.

DETAILED DESCRIPTION OF THE INVENTION

An incombustible composition for a board and/or a square timber of a fire door/wall according to the present invention includes 1 to 80 wt % of organic or inorganic fiber (a), 1 to 80 wt % of fly ash or bottom ash (b), 1 to 80 wt % of fire-proofing agent (c), 1 to 30 wt % of curing fire-retardant resin (d), and 1 to 40 wt % of incombustible hollow filler (e).

In addition, the incombustible composition of the present invention may further include an incombustible lightening agent (f), and/or an additive, such as a curing acceleration binder, a surfactant, and/or a coloring agent.

According to the present invention, it is preferable that the incombustible composition, used as the board or square timber of the fire door/wall, contains 1 to 80 wt % of organic or inorganic fiber (a). Examples of the organic fiber include paper fragments shattered into fibroid materials, shattered wood fragments, waste fibers, rice bran, vegetable fibers, and a mixture thereof, and the inorganic fiber is exemplified by rock wool, glass wool, basaltic wool, ceramic wool, and a mixture thereof. In this regard, the above exemplified organic or inorganic fibers contain some waste materials.

The organic or inorganic fiber (a) is added into the incombustible composition to enable an incombustible construction product, produced using the incombustible composition, to have similar physical properties to MDF or plywood. Accordingly, the organic or inorganic fiber (a) enables the incombustible construction product to be processed in various sizes, using a small knife (cut knife), and serves to increase the attachment force of the incombustible construction product to screws when the incombustible construction product is attached to a wall.

When the content of the organic or inorganic fiber (a) in the incombustible composition is less than 1 wt %, the incombustible construction product has improved fire-retardancy, but poor processability and attachment force to the screws due to the relatively high hardness thereof. On the other hand, when the content of the organic or inorganic fiber (a) in the incombustible composition is more than 80 wt %, the strength of the incombustible construction product is reduced to lower the dimensional stability of the incombustible construction product.

Additionally, the fly ash or bottom ash (b) is used to secure sufficient surface strength and a smooth surface of the incombustible construction product. At this time, the density, and surface and compression strengths of the incombustible construction product may be controlled in accordance with the content of fly ash or bottom ash (b) in the incombustible composition. In the present specification, the term "fly ash" means a relatively lightweight ash portion of remaining ash after the burning of coals used as a fuel in a steam power plant, the term "bottom ash" meaning ash portion heavier than fly ash.

Even though fly ash or bottom ash (b) have lighter specific gravity than the cement, fly ash or bottom ash (b) have relatively high specific gravity in comparison with other components constituting of the incombustible construction product. Hence, when the fly ash or bottom ash (b) content of the incombustible construction product is relatively high, it is difficult to accomplish the lightening of the incombustible construction product, but it is possible to obtain a strong incombustible construction product having the improved strength.

In other words, when the content of the fly ash or bottom ash (b) in the incombustible construction product is less than 1 wt %, it is difficult to produce the smooth incombustible construction product having the desired hardness and surface effect. On the other hand, when the content of the fly ash or bottom ash (b) is more than 80 wt %, the incombustible construction product is relatively high in terms of specific gravity and easily damaged by a relatively weak impact, and thus, it is not proper to use as a board or a square timber.

The organic or inorganic fiber (a) constituting the incombustible construction product may be made of combustible materials. Hence, the fire-proofing agent (c), such as calcium carbonate, sodium bicarbonate, sodium carbonate, other carbonates, or a mixture thereof, may be added into the incombustible composition to minimize the combustion of the incombustible construction product or the occurrence of toxic gases when the incombustible construction product is on fire, thereby the incombustible construction product ensures the incombustibility or quasi-incombustibility. Furthermore, when the incombustible construction product, containing the fire-proofing agent (c), are on fire at a temperature of 500° C. or higher, the fire-proofing agent (c) is decomposed to allow carbon dioxide ($CO_2$) to flow out of the incombustible construction product, thereby extinguishing the fire. Accordingly, the incombustible construction product, containing the three components, that is, the organic or inorganic fiber (a), the fly ash or bottom ash (b), and the fire-proofing agent (c), is improved in terms of the fire-retardancy because of the fire-proofing agent (c). In other words, the quasi-incombustible construction product is improved to the incombustible construction product, and the fire-retardant construction product is improved to the quasi-incombustible or incombustible construction product.

At this time, it is preferable that the content of the fire-proofing agent (c) in the incombustible composition is 1 to 80 wt %. When the content of the fire-proofing agent (c) in the incombustible composition is less than 1 wt %, the incombustible composition does not secure a sufficient fire-proofing agent effect. On the other hand, when the content of the fire-proofing agent (c) is more than 80 wt %, the strength of the incombustible construction product is reduced.

However, the incombustible composition, containing only the above three components, that is, the organic or inorganic fiber (a), the fly ash or bottom ash (b), and the fire-proofing agent (c), is disadvantageous in that it does not have desirable compression or tensile strengths required for construction material, is readily deformed when the incombustible composition is cured, and cannot be easily attached to various finishing materials even though it has incombustibility.

To avoid the above disadvantages, the curing fire-retardant resin (d), such as a phenol resin, a fire-retardant polyester resin, or a melamine resin, is added into the incombustible composition to enable the incombustible construction product to have desired physical properties, required for construction material, as well as the incombustibility.

In this respect, it is preferable that a content of the curing fire-retardant resin (d) in the incombustible composition is 1 to 30 wt %. When the content of the curing fire-retardant resin (d) is less than 1 wt %, it is impossible to conduct the curing of the incombustible composition. On the other hand, when the content of the curing fire-retardant resin (d) is more than 30 wt %, the production costs of the incombustible composition are undesirably increased while the curing efficiency of the incombustible composition is no longer increased.

Meanwhile, the incombustible hollow filler (e) may be added into the incombustible composition to improve the lightening, noise-absorbing ability, adiabatic property, and fire-retardancy of the fire door/wall. At this time, the fire-retardancy of the fire door/wall may be controlled according to a content of the incombustible hollow filler (e) in the incombustible composition. Examples of the incombustible hollow filler (e) include a perlite hollow body, a fly ash hollow body, a ceramic hollow body, an inorganic hollow body, such as a Shirasu balloon, a silica balloon, an elvan balloon, and a mineral balloon, or a mixture thereof.

In this respect, it is preferable that the content of the incombustible hollow filler (e) in the incombustible composition is 1 to 40 wt %. When the content of the incombustible hollow filler (e) is less than 1 wt %, the incombustible composition does not secure a sufficient incombustible hollow filler effect because the incombustible hollow filler (e) does not affect specific gravity, noise-absorbing ability, adiabatic property, and fire-retardancy of the incombustible composition. On the other hand, when the content of the incombustible hollow filler (e) is more than 40 wt %, the incombustible composition has a rough surface and is reduced in terms of strength.

The incombustible lightening agent (f) may be added into the incombustible composition to lighten the incombustible construction product. At this time, specific gravities of construction finishing and interior materials may be controlled according to a content of the incombustible lightening agent (f) in the incombustible composition. Examples of the incombustible lightening agent (f) include fine perlite particles, fine vermiculite particles, diatomites, zeolites, or a mixture thereof. In this respect, the waste fine perlite particles or waste fine vermiculite particles may be used as the incombustible lightening agent (f).

The content of the incombustible lightening agent (f) in the incombustible construction product may be 1 to 50 wt %. When the content of the incombustible lightening agent (f) in the incombustible composition is less than 1 wt %, the incombustible lightening agent (f) does not affect the specific gravity of the incombustible construction product and not fulfill its function. On the other hand, when the content of the incombustible lightening agent (f) is more than 50 wt %, a surface of the incombustible construction product becomes rough, strength of the incombustible construction product is reduced, and other components constituting the incombustible composition are not uniformly mixed with each other, leading to a non-uniform distribution of the components in the incombustible composition.

Furthermore, 1 to 10 wt % of curing acceleration binder (g) may be selectively added into the incombustible composition to improve the productivity of the incombustible construction product and to minimize shrinkage and deformation of the incombustible construction product when the incombustible construction product is cured. At this time, the curing acceleration binder (g) serves to enable the incombustible composition to be quickly dried, thereby constantly maintaining a shape of the incombustible composition. In this respect, examples of the curing acceleration binder (g) include magnesia, plaster, inorganic or organic acid mixtures, calcium silicate, or a mixture thereof.

As well, the surfactant (h) may be selectively added into the incombustible composition to improve adiabatic property, water resistance, and water repellence of the incombustible construction product, and to promote the lightening of the incombustible construction product. In this regard, the surfactant (h) may be exemplified by an alkylbenzene sulfonic acid-based surfactant, having relatively large surface tension, and functions to reduce resistance to water and water-absorptivity of the incombustible construction product, thereby enabling a shape of the incombustible construction product to be maintained in water. Furthermore, the surfactant (h) serves to increase porosity of the incombustible construction product to form a plurality of air layers in the incombustible construction product. Thereby, the surfactant (h) improves adiabatic property of the incombustible construction product and contributes to lightening the incombustible construction product. At this time, it is preferable that a content of the surfactant (h) in the incombustible composition is 0.1 to 0.3 wt % because the strength of the incombustible construction product may be reduced according to the content of the surfactant (h).

Meanwhile, the components (a) and (b), constituting the incombustible composition, have dark gray colors, and significantly affect a color of the entire incombustible composition. If the color of the incombustible composition is dark gray, the application of the incombustible composition to various colors of construction finishing and interior materials is limited. Accordingly, 1 to 10 wt % of white inorganic coloring agent (i) may be added into the incombustible composition. In this regard, the white inorganic coloring agent (i) is resistant to the fire and conceals well the dark gray color of the incombustible composition. Additionally, examples of the white inorganic coloring agent (i) include titanium dioxide ($TiO_2$). In conclusion, the white inorganic coloring agent (i) enables the incombustible composition to have the light gray color, thereby providing ease of the surface treatment of the incombustible construction product, such as the painting and the woodgrain coating of the incombustible construction product.

Particularly, a red or yellow inorganic coloring agent (j) may be added into the incombustible composition while being mixed in a predetermined mixing ratio to allow the surface color of the incombustible construction product to vary. At this time, a separate coloring process of the incombustible construction product may be omitted.

Meanwhile, a method of producing an incombustible board or square timber, using the incombustible composition according to a compression shaping process, includes providing the incombustible composition; mixing the fly ash or bottom ash, fire-proofing agent, and curing fire-retardant resin with each other; adding the organic or inorganic fiber into a mixture, and mixing the incombustible hollow body with the mixture, containing the organic or inorganic fiber, by use of a mixer using air; pressing the resulting mixture using a high pressure hot press to form the board or square timber; and constructing a frame of the fire door/wall using the board and/or square timber, and embedding a core material into the fire door/wall.

There will be concretely described the production of the incombustible board or square timber, below.

In the method of producing the incombustible board or square timber according to the present invention, the compression shaping process includes a first mixing process and a second pressing process. In the first mixing process, the fly ash or bottom ash (b), fire-proofing agent (c), and curing fire-retardant resin (d) are mixed with each other in a form of powder using a mixer after they are weighed with the use of a measuring system. Subsequently, the organic or inorganic fiber (a) is added into a mixture. At this time, the incombustible lightening agent (f) may be selectively added into the mixture.

The above components are mixed with each other using the mixer, for instance, a super mixer (Hensel) in which sharp blades revolves at a relatively high speed to uniformly shatter and mix the components, and the incombustible hollow filler (e) is then added into the mixture. At this time, it is preferable that the mixing is conducted using air for a relatively short time to prevent the properly shattered component (a) from being agglomerated. The resulting mixture is stored in a storage tank until the second pressing process starts.

Meanwhile, it is necessary to properly control contents of the components of the resulting mixture so as to enable the construction product to have desired specific gravity because the specific gravity of the incombustible construction product is changed according to the use of the incombustible construction product.

For example, when a construction product, such as a square timber of a wood fire door/wall, has the density of 1.0 to 1.2 $g/cm^3$, it is needed to increase the content of the component (b) in the incombustible composition so as to improve the specific gravity and strength of the square timber. However, because it is most preferable that a typical construction interior board has the density of 0.7 to 0.9 $g/cm^3$, the contents of the components constituting the incombustible composition may be properly controlled in such a way that the content of the component (b) is reduced and the content of the component (a) is increased.

Subsequently, the components, mixed so as to enable the construction product to have the desired specific gravity, are pressed using a high pressure hot press (500 to 3000 tons) at 60 to 200° C. for 1 to 60 min to accomplish the incombustible construction board.

If a high pressure hot press with a high frequency heating function is used to press the incombustible composition, the component (d) is quickly cured to significantly reduce a pressing time of the incombustible composition.

Incidentally, the components, fed into the press, may be pressed while reinforcement meshes, made of a glass fiber, are spread on upper and lower sides of the press to increase the compression and tensile strengths of the incombustible construction board.

Meanwhile, the square timber with excellent incombustibility for the fire door/wall may be produced according to a similar procedure to in the case of the incombustible construction board. Alternatively, the square timber may be produced using the construction interior board.

The construction product, having excellent incombustibility, of the present invention has various characteristics according to each process. In detail, the construction product, produced according to the compression shaping process, has a smooth surface and excellent strength, and is not deformed nor shrunk during the curing process.

In this regard, aluminum, steel, acryl, or wood may be embedded, as a reinforcing material with a shape of square timber or plate, in the construction square timber so as to improve compression and tensile strengths of the construction square timber during the compression shaping process.

In the present invention, the frame of the fire door/wall is constructed using the incombustible board and/or square timber, and the incombustible core material is then added into the frame to produce the fire door/wall.

In this regard, examples of the incombustible core material include lightweight foam concrete, autoclaved lightweight concrete (ALC), lightweight foam mineral board, lightweight foam glass board, bulk, blanket, or mat-shaped rock wool, basaltic wool, glass wool, or ceramic wool.

Furthermore, a method of producing the incombustible core material may include mixing 1 to 80 wt % of organic or inorganic fiber, 1 to 80 wt % of fly ash or bottom ash, 1 to 80 wt % of fire-proofing agent, and 1 to 60 wt % of fire-retardant curing agent with each other to produce the incombustible composition, and shaping the incombustible composition using a roller press or an autoclave. With respect to this, the incombustible core material is disclosed in the specification filed by this applicator.

Additionally, the frame constituting the fire door may be produced using the incombustible board or square timber, or using a conventional steel or stainless steel. At this time, the use of the conventional steel or stainless steel during the production of the frame brings about no negative effects to the fire-retardancy of the fire door.

Selectively, an incombustible steel plate, a mineral board, a rock wool board, a silica board, a plaster board, a magnesium board, or an alumina board may be further attached to one or more sides of the fire door/wall, and MDF, plywood, natural patterned-wood, interior film, an aluminum plate, or decorative paper may be further attached to one or more sides of the fire door/wall.

The construction product according to the present invention, having excellent incombustibility or fire-retardancy, and excellent physical properties, may be usefully applied to the following various fields.

1̂ Wood Fire Door

The fire door, produced using the incombustible board and/or square timber according to the present invention, has many advantages, such as excellent fire-resisting and fire-proofing functions, excellent processability, and various finishing functions, unlike a conventional steel fire door.

Particularly, if the wood fire door according to the present invention is applied to inner doors of tenement houses, such as apartment houses, the wood fire door functions to prevent a fire from spreading and to shield persons from toxic gases generated by fire when the houses are on fire, thereby securing improved residential environment.

2̂ Fire Wall

The use of the fire wall including the incombustible construction product, produced according to the present invention, leads to the reduction of the production costs and a load of the fire wall, and the reduction of a thickness of the fire wall (an average thickness of the typical fire wall is 100 m/m), thereby increasing an effective area of the fire wall.

Having generally described this invention, a further understanding can be obtained by reference to examples and comparative examples which are provided herein for the purposes of illustration only and are not intended to be limiting unless otherwise specified.

Physical properties of samples according to the examples and comparative examples are evaluated as follows.

1) Incombustibility, quasi-incombustibility, and fire-retardancy: the samples are evaluated in three categories according to a KS F2271 method (a fire-retardant performance test method for construction materials): first-grade fire-retardancy (incombustible materials), second-grade fire-retardnacy (quasi-incombustible materials), and third-grade fire-retardancy (fire-retardant materials)

2) Specific gravity and density: The specific gravities and densities of the samples are measured according to a KS L5316 method (test method of physical properties of plaster boards)

3) Fire resistance: The fire resistances of the samples are evaluated according to a KS F3507 method (plaster boards)

4) Submergence stability: The submergence stabilities of the samples are evaluated according to the KS F3507 method (plaster boards).

The construction products according to the compression shaping process, as described in the examples, were compared with commercial construction products as described in the comparative examples for the incombustibility, quasi-incombustibility, or fire-retardancy. In this respect, the incombustibility, quasi-incombustibility, or fire-retardancy is considered as the most important factor, to be accomplished in the present invention. In detail, the construction products were evaluated in three categories according to the KS F2271 method: first-grade fire-retardancy (incombustible materials), second-grade fire-retardnacy (quasi-incombustible materials), or third-grade fire-retardancy (fire-retardant materials). In this regards, these evaluations were conducted according to contents of components constituting the construction products and a kind of the construction products, and compared with each other.

Furthermore, a weight per unit area of each construction product was measured, and a weight change of the construction product according to a mixing ratio of the components was measured. Additionally, stability of each construction product against fire was evaluated by use of fire resistance of the construction product.

Particularly, the submergence stabilities of the construction products were evaluated because it is required that most of the construction finishing and interior materials have the submergence stabilities.

EXAMPLES 1 TO 4

A fly ash or bottom ash (b), a fire-proofing agent (c), and a curing fire-retardant resin (d) were mixed with each other in a mixing ratio as described in the following Table 1 using a mixer after they were weighed with the use of a measuring system. Subsequently, an organic or inorganic fiber (a) was added into a mixture, and uniformly mixed with the mixture while the resulting mixture was shattered using a super mixer (Hensel). An incombustible hollow filler (e) was then added into the resulting mixture. At this time, the mixing was conducted using air for ten minutes to prevent the properly shattered component (a) from being agglomerated. The resulting composition was stored in a storage tank before a second pressing process was conducted.

The resulting composition was then pressed using a high pressure hot press (about 1,000 tons) at about 150° C. for about 30 min to produce incombustible boards, each having a thickness of 35 m/m and a size of 900 mm×2100 mm. Physical properties of the incombustible boards were evaluated according to the above evaluation methods, and the results are described in the following Table 1.

TABLE 1

Physical properties of incombustible construction products produced according to a compression shaping process

| | Composition (wt %) | | | | | | Physical properties of the construction products | | | |
|---|---|---|---|---|---|---|---|---|---|---|
| | $^1$(a) | $^2$(b) | $^3$(c) | $^4$(d) | $^5$(e) | $^6$Shap. | $^7$Fire | $^8$Sp. | $^9$Subm. | Fire resistance |
| Ex. 1 | 70 | 10 | 5 | 10 | 5 | Board | 1$^{st}$ grade | 0.754 | Stable | Incombustible |
| Ex. 2 | 60 | 15 | 10 | 10 | 5 | Board | 1$^{st}$ grade | 0.882 | Stable | Incombustible |
| Ex. 3 | 50 | 15 | 15 | 10 | 10 | Square timber | 1$^{st}$ grade | 1.052 | Stable | Incombustible |
| Ex. 4 | 40 | 20 | 20 | 10 | 10 | Square timber | 1$^{st}$ grade | 1.174 | Stable | Incombustible |

$^1$(a): component (a), rock wool,
$^2$(b): component (b), fly ash,
$^3$(c): component (c), calcium carbonate,
$^4$(d): component (d), phenol resin,
$^5$(e): component (e), fly ash hollow body,
$^6$Shap.: shape of the construction product,
$^7$Fire: fire-retardancy,
$^8$Sp.: density/specific gravity
$^9$Subm.: submergence stability From the Table 1, it can be seen that higher content of the rock wool in the composition brings about lower specific gravities of the boards of the examples 1 and 2 and the square timbers of the examples 3 and 4, produced according to the compression shaping process. Furthermore, the fire-retardancies and fire resistances of the construction products according to the examples 1 to 4 are the same as each other.

Comparative Examples 1 to 5

Physical properties of five commercial construction finishing and interior products, including MDF/plywood, a typical plaster board, a fire-proofing plaster board, a slate board, and a wood-wool cement board, were evaluated according to the above evaluation methods, and the results are described in the following Table 2.

TABLE 2

Physical properties of the commercial construction finishing and interior products

| | Composition | | | | Physical properties of the construction products | | | |
|---|---|---|---|---|---|---|---|---|
| | [1](a) | [2](b) | [3](c) | Product | [4]Fire | [5]Sp. | [6]Subm. | [7]Fire res. |
| Co. Ex. 1 | Wood chip | Adhesive | Water-repellent material | MDF/plywood | None | 0.7~0.8 | Unstable | Combustible |
| Co. Ex. 2 | Waste plaster | — | Paper pasteboard | Typical plaster board | 2nd grade | 0.8~1.0 | Damaged | Noncombustible |
| Co. Ex. 3 | Waste plaster | Glass fiber | Paper pasteboard | Fire-proofing plaster board | 1st grade | 1.0~1.1 | Damaged | Incombustible |
| Co. Ex. 4 | Cement | Asbestos | Stone powder | Slate board | 1st grade | 1.2~1.4 | Stable | Incombustible |
| Co. Ex. 5 | Cement | Waste paper | Plaster | Wood-wool cement board | 1st grade | 1.0~1.2 | Stable | Incombustible |

[1](a): component (a),
[2](b): component (b),
[3](c): component (c),
[4]Fire: fire-retardancy,
[5]Sp.: density/specific gravity
[6]Subm.: submergence stability
[7]Fire res.: fire resistance From the Table 2, it can be seen that the commercial construction finishing and interior products have no fire-retardancy, second grade fire-retardancy, first grade fire-retardancy, first grade fire-retardancy, and first grade fire-retardancy for comparative examples 1 (MDF/plywood), 2 (typical plaster board), 3 (fire-proofing plaster board), 4 (slate board), and 5 (wood-wool cement board), respectively. Accordingly, the typical and fire-proofing plaster boards have no problems in securing a fire-safety, and the slate board and wood-wool cement board are most preferable to be used as a fire-proofing material.

As shown in the Table 2, the products according the comparative examples 4 and 5 each have the best incombustibility. However, each of them have a weight per unit area of 1.0 to 1.4, and thus, they are problematic in terms of their lightening. Additionally, the plaster boards each have the poorest submergence stability.

As results, MDF or plywood, widely used as the construction finishing and interior material, has no fire-retardancy, and thus, it is not suitable to be used as the construction material in consideration of the Building Standards Act and the Fire Services Act. Further, the use of the plaster board is limited according to uses and positions of buildings. As for the slate board and wood-wool cement board, they have a lot higher weight per unit area than MDF and the plaster board, thereby ease of their use in constructing buildings cannot be ensured.

A detailed description will be given of the comparison of the examples with the comparative examples, below.

As described in the Table 1, in the examples 1 and 2, the weight per unit area of the incombustible board, produced according to the compression shaping process, is 0.7 to 0.9, which is the similar to that of MDF of the comparative example 1 as described in the Table 2. Additionally, the fire-retardancy and fire resistance of such incombustible board are similar to those of the fire-proofing plaster board of the comparative example 3. Furthermore, the submergence stabilities of the incombustible boards of the examples 1 and 2 are excellent, and thus, a shape of each incombustible board is stably maintained in water without being deformed.

As well, the square timbers, produced according to the compression shaping process, of the examples 3 and 4 as described in the Table 1 each have the first-grade fire-retardancy, like the slate board and wood-wool cement board according to the comparative examples 4 and 5 as described in the Table 2. In addition, the square timbers are incombustible in terms of fire resistance. Furthermore, the weights per unit area of the square timbers according to the examples 3 and 4 as described in the Table 1 are 1.0 to 1.2, which are similar to those (1.0 to 1.4) of the slate board and wood-wool cement board according to the comparative examples 4 and 5 as described in the Table 2.

Experimental Example 1

A board of the example 1 as described in the Table 1, and a square timber of the example 3 were used to construct a frame of a fire door, a core material made of ceramic wool was embedded in the fire door, and plywood was attached to any one side of the fire door to accomplish the incombustible fire door with a thickness of 35 m/m and a size of 900 mm×2100 mm. The incombustible fire door was tested for fire according to KS F2257 in Korea Institute of Construction Technology. In this regard, the incombustible fire door was subjected to a first-grade fire door test for 1 hour, and stood the fire test as described in the following Table 3.

TABLE 3

Physical properties of the incombustible fire door including the board, square timber, and core material

| | Composition (wt %) | | | | | | | Physical properties of the construction product | | | |
|---|---|---|---|---|---|---|---|---|---|---|---|
| | [1](a) | [2](b) | [3](c) | [4](d) | [5](e) | [6]Ceram. | [7]Shap. | [8]Fire | [9]Fire res. | [10]Subm. | [11]Test |
| Board | 70 | 10 | 5 | 10 | 5 | — | Door | 1st grade | Incombustible | Stable | Pass |
| Square timber | 50 | 15 | 15 | 10 | 10 | — | | 1st grade | Incombustible | Stable | |
| Core material | — | — | — | — | — | 100 | | 1st grade | Incombustible | Unstable | |

[1](a): component (a), rock wool,
[2](b): component (b), fly ash,
[3](c): component (c), calcium carbonate,
[4](d): component (d), phenol resin,
[5](e): component (e), fly ash hollow body
[6]Ceram.: ceramic wool,
[7]Shap.: shape of the construction product,
[8]Fire: fire-retardancy,
[9]Fire res.: fire resistance
[10]Subm.: submergence stability
[11]Test.: fire test (1 hour)

As described above, the present invention provides an incombustible composition used to produce incombustible/quasi-incombustible/fire-retardant board, square timber, and core material. In this regard, 1 to 70 wt % of the incombustible composition may be made of a waste material. Accordingly, the incombustible composition of the present invention is advantageous in that the production costs are reduced, and that it is useful as a construction finishing and interior material because no fire and toxic gases occur when the board or square timber is on fire.

Other advantages are that the incombustible composition has excellent processability (saw processing, screwing, planing, attachment of patterned wood and film, coating, and the like), and that an incombustible construction product, produced using the incombustible composition, has excellent strength and water resistance. In addition, the incombustible construction product is not easily deformed, and can be applied to fields, to which woods or boards are applied, while having incombustibility, thereby being applied to construction interior/exterior materials. Furthermore, the incombustible construction product serves to prevent fire from spreading and to shield persons from toxic gases generated by fire when the incombustible construction product is on fire, thereby providing safe life environment.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An incombustible composition for a fire door/wall, comprising 30 to 80 wt % of organic or inorganic fiber, of which 55 wt % is rock wools, 5 to 50 wt % of fly ash or bottom ash, of which 12 to 17 wt % is fly ash or synthetic silica, 5 to 50 wt % of fire-proofing agent, of which 8 wt % is calcium carbonate, 1 to 15 wt % of curing fire-retardant resin, of which 3 to 10 wt % is a phenol resin and 1 to 20 wt % of incombustible hollow filler, wherein the incombustible hollow filler comprises 10 wt % of fly ash balloon and 2 wt % of perlite.

2. The incombustible composition as set forth in claim 1, wherein the organic fiber is paper fragments shattered into fibroid materials, shattered wood fragments, waste fibers, rice bran, vegetable fibers, or a mixture thereof, and the inorganic fiber is rock wool, glass wool, basaltic wool, ceramic wool, or a mixture thereof.

3. The incombustible composition as set forth in claim 1, wherein the fire-proofing agent is calcium carbonate, sodium bicarbonate, other carbonates, or a mixture thereof.

4. The incombustible composition as set forth in claim 1, wherein the curing fire-retardant resin is a phenol resin, a fire-retardant polyester resin, or a melamine resin.

5. The incombustible composition as set forth in claim 1, wherein the incombustible hollow filler is a perlite hollow body, a fly ash hollow body, a ceramic hollow body, a Shirasu balloon, a silica balloon, an elvan balloon, a mineral balloon, or a mixture thereof.

6. The incombustible composition as set forth in claim 1, further comprising 1 to 50 wt % of incombustible lightening agent, and/or 1 to 10 wt % of additive selected from the group consisting of a curing acceleration binder, a surfactant, an inorganic coloring agent, and a mixture thereof.

7. The incombustible composition as set forth in claim 6, wherein the incombustible lightening agent is fine perlite particles, fine vermiculite particles, datomites, zeolites, or a mixture thereof.

8. The incombustible composition as set forth in claim 6, wherein the curing acceleration binder is magnesia, plaster, inorganic or organic acid mixtures, calcium silicate, or a mixture thereof.

9. A method of producing an incombustible fire door/wall, comprising:
providing the incombustible composition according to claim 1, using only dry materials;
mixing a fly ash or bottom ash, a fire-proofing agent, and a curing fire-retardant resin with each other;
adding an organic or inorganic fiber into a mixture, shattering the mixture containing the organic or inorganic fiber, and mixing an incombustible hollow body with the shattered mixture by use of a mixer using air;

pressing the resulting mixture using a high pressure hot press to form a board or square timber; and constructing a frame of the fire door/wall using the board and/or square timber and embedding an incombustible core material into the fire door/wall.

10. The method as set forth in claim 9, further comprising reinforcing an inside and/or an outside of the board using meshes, made of a glass fiber, to improve compression and tensile strengths of the board in the pressing of the resulting mixture.

11. The method as set forth in claim 9, further comprising embedding a square timber or plate shape of aluminum, steel, acryl, or wood into the square timber to reinforce the square timber to improve compression and tensile strengths of the square timber in the pressing of the resulting mixture.

12. The method as set forth in claim 9, further comprising mixing an incombustible lightening agent, a curing acceleration binder, and/or an inorganic coloring agent with the mixture of the fly ash or bottom ash, fire-proofing agent, and curing fire-retardant resin in the mixing of the fly ash or bottom ash, fire-proofing agent, and curing fire-retardant resin.

13. The method as set forth in claim 9, wherein the incombustible core material is lightweight foam concrete, autoclaved lightweight concrete (ALC), lightweight foam mineral board, lightweight foam glass board, bulk, blanket, or mat-shaped rock wool, basaltic wool, glass wool, or ceramic wool.

14. The method as set forth in claim 9, wherein the incombustible core material is produced by mixing 1 to 80 wt % of organic or inorganic fiber, 1 to 80 wt % of fly ash or bottom ash, 1 to 80 wt % of fire-proofing agent, and 1 to 60 wt % of fire-retardant curing agent with each other to produce the incombustible composition, and shaping the incombustible composition using a roller press or an autoclave.

15. An incombustible fire door/wall produced according to the method of claim 9.

16. The incombustible fire door/wall as set forth in claim 15, wherein an incombustible steel plate, a mineral board, a rock wool board, a silica board, a plaster board, a magnesium board, or an alumina board is attached to one or more sides of the fire door/wall.

17. The incombustible fire door/wall as set forth in claim 15, wherein, MDF, plywood, natural patterned-wood, interior film, an aluminum plate, or decorative paper is attached to one or more sides of the fire door/wall.

* * * * *